Figure 1:
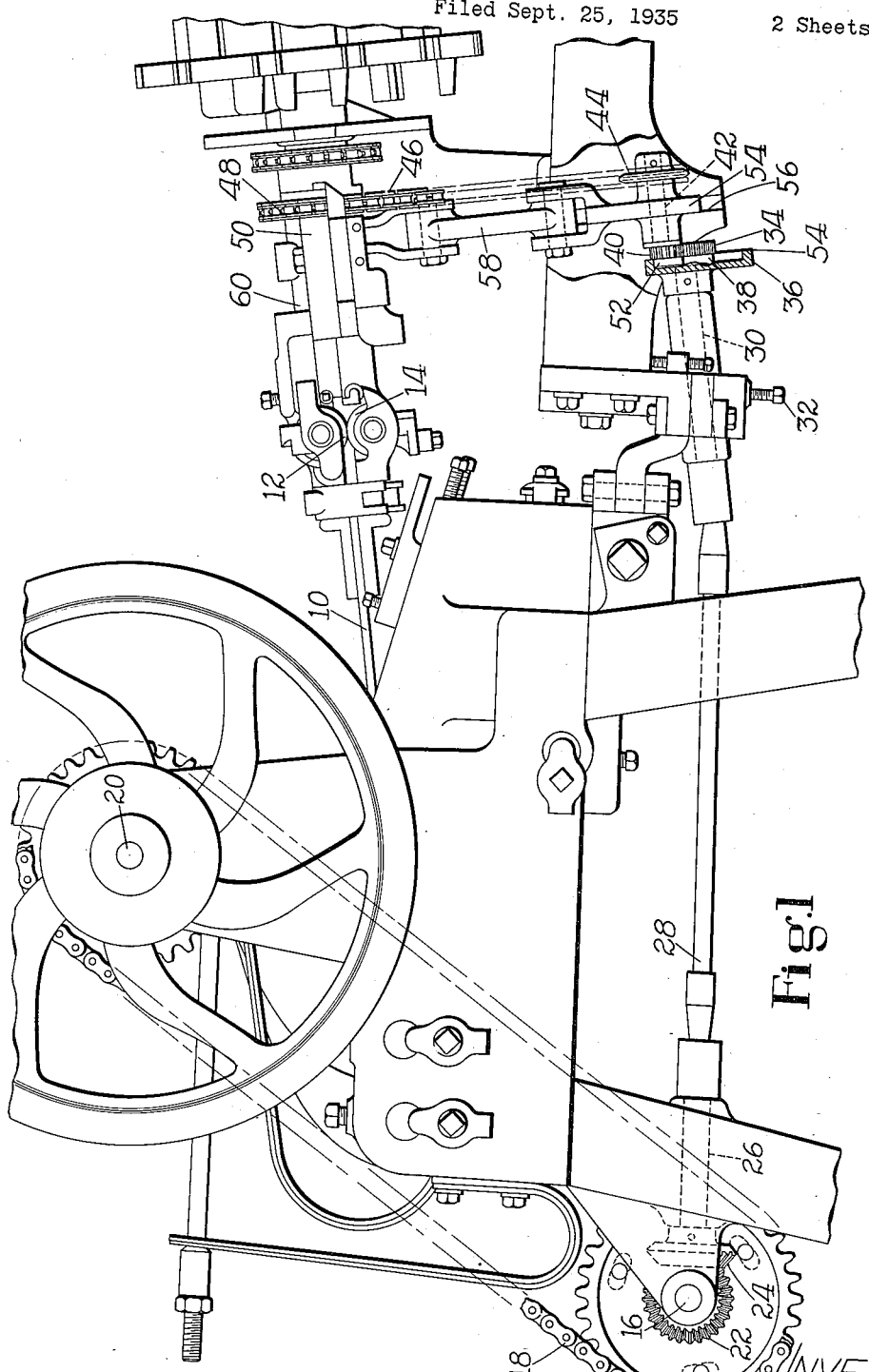

July 28, 1936.

B. P. COOPER ET AL 2,048,839

TACK MAKING MACHINE

Filed Sept. 25, 1935

2 Sheets-Sheet 1

INVENTORS
Basil Pomeroy Cooper
James Norman Henshaw
By their attorney
Victor Cobb July 28, 1936.　　B. P. COOPER ET AL　　2,048,839
TACK MAKING MACHINE
Filed Sept. 25, 1935　　2 Sheets-Sheet 2
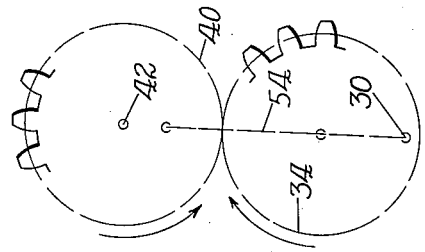
Fig.6.
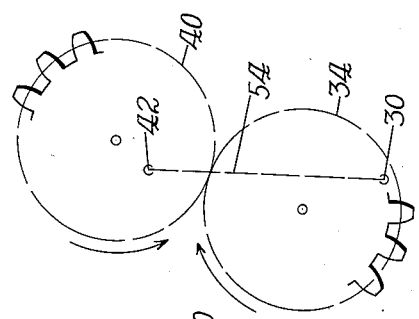
Fig.5.
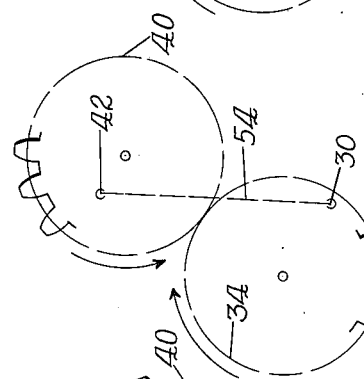
Fig.4.
Fig.3.
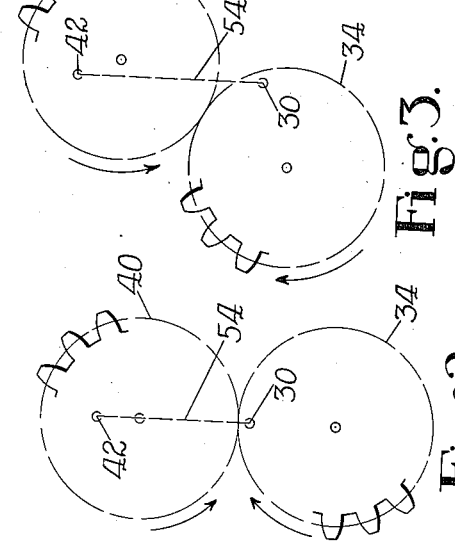
Fig.2.
INVENTORS
Basil Pomeroy Cooper
James Norman Henshaw
By their Attorney
Victor Coll.

Patented July 28, 1936

2,048,839

UNITED STATES PATENT OFFICE 2,048,839

TACK MAKING MACHINE

Basil Pomeroy Cooper and James Norman Henshaw, Leicester, England, assignors to United Shoe Machinery Corporation, Paterson, N. J., a corporation of New Jersey Application September 25, 1935, Serial No. 42,149 In Great Britain October 3, 1934

8 Claims. (Cl. 10—174)

This invention is concerned with improvements in or relating to driving mechanisms and is illustrated as embodied in a machine for making tacks or nails from flat strips of metal, the illustrated machine being of the type shown in United States Letters Patent No. 1,396,191, granted November 8, 1921, on the application of George Goddu.

Machines of this kind which are in general use at the present time usually comprise a strip guiding nozzle or barrel through which a strip of metal, of a width slightly longer than the length of the fastenings to be made from it, to allow for forming the heads of the fastenings, is fed by suitable means toward dies which shear from an end of the strip projecting beyond the nozzle or barrel a tapered or wedge-shaped blank for a tack, a heading die being caused, after the severance of the blank, to strike against the wider end of the blank to spread it into a head. In order that the shearing dies may sever tapered blanks from the strip, the nozzle or barrel in such machines has a slight angular relation to a line drawn perpendicularly to the shearing edges of the dies so that these dies sever an end portion from the strip along a line which makes a slight angle to a line extending across the strip perpendicularly to the length thereof, and, in order to invert or reverse the strip so that like successive blanks may be cut from the strip with their pointed ends extending in the same direction, such machines are provided with means for turning the barrel or nozzle together with the strip therein through 180° about its axis between successive blank severing operations. Also, since the strip rests flat on the upper surface of the lower shearing die at the instant the shearing cut is made, it is advisable, in turning over the nozzle and its contained blank-strip, to lift it sufficiently to permit the lower corner of the turning strip to clear the upper surface of the lower die. It is also necessary that, during the shearing operation, the strip lie substantially motionless upon the upper surface of the lower die.

In the machine of the patent referred to, these requirements are met by a drive mechanism comprising two elliptical miter gears which rotate the nozzle, always in the same direction, by steps of 180°, the elliptical gears being so arranged as to produce minimum angular velocity when the blank-strip is resting on the upper surface of the lower die, and maximum angular velocity when the plane of the blank-strip is perpendicular to the upper surface of the lower die, at the point where the strip is turned over half way. The raising of the nozzle and strip, to permit this turning over, is effected by an eccentric linked to the member which carries the nozzle, and mounted on the shaft driven by the elliptical gears.

It is well known that elliptical gearing, particularly elliptical miter gearing is highly expensive to manufacture, having to be made largely by hand work.

Various of the several objects of the present invention are to provide an improved mechanism for rotating and lifting the blank-strip which will impart, between successive operations of the dies, partial rotations in the same direction and also lift the strip-guiding nozzle of such a machine, which mechanism shall be simple, cheap, compact and durable and will act to cause the partial rotations of the nozzle to take place at relatively high speed so as to reduce the time necessary for the inversion of the strip and will yet reduce the rotary movements of the strip substantially to zero at the desired times to enable the blank severing operations to be carried out with ease and efficiency.

In accordance with a principal feature of the invention this is accomplished by providing, in a tack making machine a novel organization comprising cutting dies, a driving shaft in a normally fixed position and a laterally movable as well as rotatable driven shaft, and gearing located between them arranged to transform uniform rotation of the driving shaft into a non-uniform rotation and a lateral translatory movement of the driven shaft. In the preferred embodiment of the invention illustrated herein, each of said shafts has an ordinary circular pinion mounted thereon, and at least one of said pinions is eccentrically mounted on its shaft. This eccentric mounting effects not only the variable angular velocity desired in the driven shaft, but also effects the desired translatory movement, discussed above, as will be fully explained below.

In the particular illustrative embodiment of the invention hereinafter described the driven shaft imparts the desired partial rotations to the nozzle by means of a chain and sprocket wheels and a sliding suport for this shaft is coupled by a link to a support for the nozzle, the shaft and its support being arranged to be lifted to lift the nozzle by the operation of means which rotates the shaft, in such manner that lifting of the nozzle and a half rotation thereof at an increasing speed to lift and invert the strip occur simultaneously in the first half cycle and a descent of the nozzle to lay the strip flat on the stationary or lower die and a rapid decrease in the speed of the rotary movement of the nozzle also occur simultaneously in the second half cycle. For rotating and lifting the said shaft in the manner above indicated the driven shaft carries a circular pinion which is offset from the axis of the shaft and meshes with a second circular driving pinion which is offset to a larger degree from the axis of a second and parallel driving shaft carrying it, the driving shaft rotating uniformly and continuously in one direction and being positioned at a lower level than the driven shaft. The eccentric relations of the two pinions relatively to their shafts and the bodily rotary movement imparted to the driven pinion by the driving pinion are such that when the nozzle is in its lowest position with the strip positioned flat on the stationary die the rotary movement of the nozzle will have been reduced to a negligible amount although the driving shaft rotates continuously at a constant speed, and when the nozzle commences to lift, owing to bodily lifting of the driven pinion by the driving pinion, it also commences to rotate at an increasing speed and its angular velocity increases until the nozzle has reached its highest position after which time the angular rotation of the nozzle decreases progressively as the nozzle is allowed to descend by the descent of the driven pinion.

These and other features of the invention comprising certain combinations and arrangements of parts will be apparent from the following description of a prefered embodiment of the invention shown in the drawings, in which Fig. 1 is a side elevation showing sufficient of a machine embodying the illustrative embodiment to enable the construction and operation of the latter to be understood; and Figs. 2 to 6 illustrate a series of positions of the pinions characteristic of the present invention, Fig. 2 illustrating the lowest position and slowest speed of the driven shaft, and Fig. 6 the highest position and the fastest speed.

As already stated, the machine illustrated is a tack-making machine which is in many respects similar in construction to that disclosed in the patent referred to and has a stationary cutting die and movable cutting dies for severing blanks from the end of a strip, and a header for forming the heads on the said blanks arranged as in the machine disclosed in the patent referred to. The illustrative machine has a nozzle 10 arranged and supported similarly to the nozzle 128 described in the said patent through which nozzle a tack strip is fed against a stop positioned close behind the shearing edges of the shearing dies, and feed wheels 12 and 14 arranged and operated similarly to the wheels 164, 184 described in the patent referred to for feeding the strip through the nozzle towards the said stop (i. e., towards the left in Fig. 1) to position its end correctly beneath the movable dies.

For imparting to the nozzle rotations of 180° in the same direction between successive shearing operations of the dies and for lifting the nozzle sufficiently during such rotations to enable the end of the nozzle nearer the dies to clear the stationary die, the illustrative machine is provided with a secondary shaft 16 extending forwardly and rearwardly as seen in Fig. 1 similar to the shaft referred to as 86 in the patent referred to, which secondary shaft is driven by a chain 18 from the main shaft 20 of the machine (which latter operates the movable dies through cams on it, for example, as in the well-known Perkins tack machine) at the same speed as the shaft 20. The shaft 16 drives through ordinary bevel gears 22 and 24 of equal diameter, a third shaft 26 extending towards the right. This third shaft drives, by means of a rod 28 having universal joints at its opposite ends, a shaft 30 which lies parallel to the nozzle and beneath the latter. The shaft 30, though normally fixed in position, may be adjusted vertically by a screw 32 to determine the correct heightwise position of the nozzle relatively to the dies, it being connected to the nozzle by means now to be described.

The right-hand end of the shaft 30 has fast to it an ordinary circular pinion 34 the pitch circle of which may be, in the machine illustrated, one inch in diameter and the center of the pinion (which forms a driving pinion for rotating the nozzle 10) is offset from the axis of the shaft some 7/16 inch. The pinion 34 is secured to the shaft 30 through a disk 36 which is itself eccentrically mounted on the shaft, its center being offset from the axis of the shaft 30 some 7/16 inch, so that the pinion 34 is mounted centrally on the disk 36. A central circular boss 38, also one inch in diameter, projects from the disk 36 and the pinion 34 is keyed to a pin projecting centrally from the boss 38. The boss 38, as later described, constitutes a lifting member for lifting the nozzle at the desired times. The driving pinion 34 meshes with another pinion 40 of the same size which is positioned above it and this pinion is carried at the left-hand end of a short shaft 42 which lies parallel to the shaft 30 and at its right-hand end the shaft 42 carries a small sprocket wheel 44 over which passes a chain 46 passing around a sprocket wheel 48, of twice the size of the wheel 44, secured on a rotating head 50 in which the nozzle 10 is supported, as in the patent referred to. By this means, one rotation of the main shaft 20 imparts a half rotation to the nozzle 10 and since the dies operate to sever a blank from the strip at each rotation of the shaft 20 the nozzle 10 is rotated through half a revolution in each cycle of the machine. The center of the pinion 40 is offset some 7/32 inch from the axis of its carrying shaft 42 and a roller 52 mounted concentrically with the pinion 40 just in front of the latter engages constantly with the lifting member 38 on the shaft 30. In order to maintain the roll 52 and the lifting member 38 and the pinions 34 and 40 against separation during the operation of the machine, the disk 36 is provided with an overhanging flange 54 which is concentric about the axis of the lifting member 38 and engages the roll 52 at its outer side to prevent it from moving away from the lifting member and to keep the teeth of the two pinions constantly in mesh. The disk 36 and the members 38, 52 thus act as a link connecting the axes of the pinions 34 and 40.

The shaft 42 which carries the pinion 40 is mounted in a bearing in a slide 55 which is arranged in a slideway 56 provided in the machine frame at right angles to the nozzle and to the shaft 42 and the slide is coupled to the rotating head 50 which supports the nozzle 10 by an adjustable link 58 having pivotal connections at its opposite ends with the slide and with the rotating head 50 so that a rising movement of the slide causes the nozzle 10 to rise a similar extent, the nozzle and the rotating head being supported for such rising movement in a pivotally supported yoke 60 similar to that referred to as 68 in the patent referred to.

The two pinions 34 and 40 are so timed that when a strip passing through the nozzle is lying flat upon the lower stationary die and the blank severing operation is taking place they are each at their lowest positions about their shafts, as indicated in Fig. 1, i. e., at that time a line passing vertically through the axes of the shafts 30 and 42 will also pass through the axes of the two pinions, the axis of the driving pinion 34 lying directly below the axis of the shaft 30 and the axis of the driven pinion 40 lying directly below the axis of the shaft 42 and over the axis of the shaft 30. As before stated the pitch diameters of the two pinions are each one inch and the driving pinion 34 is offset some 7/16 inch (i. e., a distance nearly equal to the radius of its pitch circle) from the axis of its supporting shaft 30. Owing to this fact the pitch circle of this pinion will at its uppermost portion lie nearly on the axis of its carrying shaft 30 at this time. Since the driving thrust of the pinion 34 to the pinion 40 takes place along their pitch circles and since also at this time the teeth of the pinion 40 mesh with the teeth of the pinion 34 on the uppermost side of the latter and as, moreover, the rotation of the pinion 34 takes place about the axis of the shaft 30, any rotary movement imparted to the pinion 40 and therefore to the nozzle by the uppermost teeth of the pinion 34 at the instant at which the strip lies flat on the stationary die will be so small as to be negligible and the shearing action of the dies will not therefore be impeded by any appreciable movement of the strip. The more nearly the eccentricity of the pinion 34 approximates to the pitch radius of the pinion, the more nearly a perfect stop at the time of shear is approximated.

It will be appreciated, however, that the time during which the nozzle remains in its lowest position for the shearing operation of the dies need only be extremely short since the shearing operation of the dies takes place almost instantaneously and immediately the pinion 34 has passed through its lowest position it commences to rise in a circular path, as shown in Figs. 2 to 6, this path having a radius equal to the distance the axis of the pinion is offset from the axis of its shaft 30, and as it does so the lifting member 38 which is concentric with it lifts the roll 52 carried by the pinion 40 and thereby lifts the nozzle through the slide 54 and link 58, the combined rising and rotating movement of the driving pinion 34 causing portions of the periphery of this pinion which occupy positions progressively spaced further from the axis of rotation of its carrying shaft 30, and therefore having linear speeds of progressively increasing amounts, to engage progressively with the teeth on the driven pinion 40 so that the speed at which the latter and therefore the nozzle is rotated increases as the pinion 40 rises, and reaches its maximum when the pinion reaches the top of its lifting movement, indicated in Fig. 2. The speed of rotation of the nozzle and of its lifting therefore increase simultaneously up to its highest position and decrease simultaneously thereafter until the nozzle becomes sufficiently stationary when the inverted strip is once more laid on the stationary die. The driven pinion 40 will be rotated once, at a continually varying speed, about the axis of its carrying shaft 42 during each complete rotation of the driving pinion 34 and the extent of the lift imparted to the nozzle by the rising of the driving pinion 34 is indicated by a comparison of Figs. 2 and 6. It will be equal to twice the difference in the eccentricities of the pinions 34 and 40, i. e., the lift in the illustrated machine will be some 1/16 inch, which distance is sufficiently great to allow any nozzle which is likely to be used in a machine making small tacks to clear the stationary die as the nozzle is rotated in the manner above described.

An indication of the efficiency of the eccentric pinion arrangement in rotating the nozzle at a high speed at certain times and in reducing this rotation to a minimum at other times is shown by the fact that, with pinions of the size and arranged as indicated, the angular velocity of the nozzle when it is at its highest position in inverting the strip will be more than fifteen times as great as at its lowest position.

From what has been said it will be appreciated that the illustrative embodiment provides a very simple, cheap, and compact mechanism, which, if desired, can be enclosed in a simple casing, and which serves both to impart the desired vertical movements and partial rotations to the nozzle at a relatively high speed and yet causes the angular velocity of the strip to be reduced to a negligible amount, when the strip lies on the stationary die, for a sufficient period to allow the moving dies to shear a blank therefrom. This mechanism is light in weight, takes but little power to drive and has been found to stand up well during long periods of use.

The roller 52 and lifting member 38 above referred to, as will be understood, relieve the pinions themselves from the strain of lifting the nozzle but, if desired, the roller and the lifting member and the disk 36 may be dispensed with and replaced by other constructions which will hold the pinions 34 and 40 at a fixed distance from each other. Such a construction, for example, could be a link, as already suggested.

Having described our invention, what we claim as new and desire to secure by Letters Patent of the United States is:

1. In a tack making machine, a pair of shearing dies, a blank-strip carrying member arranged to lay the end of a blank-strip carried by it on the lower die to facilitate the shearing of a tack blank from the strip, and to raise and to turn over and lower the blank-strip in preparation for the shearing of a second tack blank, a vertically and rotatably movable shaft located below the carrying member and having a connection of fixed length and a driving connection therewith, whereby the rotation of the shaft will rotate the carrying member and the raising and lowering of the shaft will raise and lower, respectively, the carrying member, a drive shaft having its axis in a normally fixed position substantially parallel to that of the first said shaft, and gearing located between the two said shafts constructed and arranged to transform uniform rotation of the drive shaft into non-uniform rotation and translation in a direction transverse to its axis, of the first said shaft.

2. In a tack making machine, a pair of shearing dies, a blank-strip carrying member arranged to lay the end of a blank-strip carried by it on the lower die to facilitate the shearing of a tack blank from the strip, and to raise and to turn over and lower the blank-strip in preparation for the shearing of a second tack blank, a vertically and rotatably movable shaft located below the carrying member and having a connection of fixed length and a driving connection therewith, whereby the rotation of the shaft will rotate the carrying member and the raising and lowering of the shaft will raise and lower, respectively, the carrying member, a drive shaft having its axis in a normally fixed position substantially parallel to that of the first said shaft, and gearing located between the two said shafts constructed and arranged to transform uniform rotation of the drive shaft into non-uniform rotation and translation in a direction transverse to its axis, of the first said shaft, said gearing comprising an ordinary pinion eccentrically mounted on one of said shafts.

3. In a tack making machine, a pair of shearing dies, a blank-strip carrying member arranged to lay the end of a blank-strip on the lower die to facilitate the shearing of a tack blank from the strip and to raise and to turn over and lower the blank-strip carried by it in preparation for the shearing of a second tack blank, and means for raising and turning over the carrying member comprising a drive shaft and a driven shaft located below the carrying member, a connection of fixed length between the driven shaft and the carrying member and two meshing pinions mounted on the shafts, respectively, one of said pinions being eccentrically mounted on its shaft.

4. In a tack making machine, a blank-strip carrier and mechanism for lifting, turning over and dropping the carrier comprising a drive shaft, and a driven shaft parallel thereto located beneath the carrier, a lifting and rotary drive connection of normally fixed length between the driven shaft and the carrier, and a driving connection between the shafts comprising a pair of pinions mounted eccentrically on the shafts, respectively.

5. In a tack making machine, a blank-strip carrier and mechanism for lifting, turning over and dropping the carrier comprising a drive shaft, and a driven shaft parallel thereto located beneath the carrier, a lifting and rotary drive connection of normally fixed length between the driven shaft and the carrier, and a driving connection between the shafts comprising a pair of pinions mounted eccentrically on the shafts, respectively, the pinions being so timed that they simultaneously reach extreme positions relatively to the carrier.

6. In a tack making machine, a blank-strip carrier and mechanism for lifting, turning over and dropping the carrier comprising a drive shaft, and a driven shaft parallel thereto located beneath the carrier, a lifting and rotary drive connection of normally fixed length between the driven shaft and the carrier, and a driving connection between the shafts comprising a pair of pinions mounted eccentrically on the shafts, respectively, the pinions being so timed that they simultaneously reach their maximum and minimum distances from the carrier.

7. In a tack making machine, a blank-strip carrier and mechanism for lifting, turning over and dropping the carrier comprising a drive shaft, and a driven shaft parallel thereto located beneath the carrier, a lifting and rotary drive connection of normally fixed length between the driven shaft and the carrier, and a driving connection between the shafts comprising a pair of pinions mounted eccentrically on the shafts, respectively, the eccentricity of the pinion on the driving shaft being greater than that of the pinion on the driven shaft, and the mechanism being so timed that the centers of the pinions come simultaneously into the plane of the shafts.

8. In a tack making machine, a blank-strip carrier which is both rotatable and translatable in a direction transverse to its length, and mechanism for rotating and translating the carrier comprising a driven shaft geared to the carrier, said driven shaft being slidable in the direction in which the translation of the carrier is to take place, a connection of fixed effective length between the driven shaft and the carrier arranged to permit rotation of the carrier by the driven shaft through the gear drive, a driving shaft offset from the driven shaft in the said direction of translation, each of said shafts having a gear wheel eccentrically mounted on it and said gear wheels being in mesh, the timing being such that the centers of the gear wheels simultaneously reach extreme positions relatively to the carrier as the driving shaft is rotated.

JAMES NORMAN HENSHAW.
BASIL POMEROY COOPER.